US009055452B2

(12) United States Patent
Ramos et al.

(10) Patent No.: US 9,055,452 B2
(45) Date of Patent: Jun. 9, 2015

(54) NETWORK NODE, USER EQUIPMENT AND METHODS THEREIN

(71) Applicant: TELEFONAKTIEBOLAGET L M ERICSSON (publ), Stockholm (SE)

(72) Inventors: Edgar Ramos, Espoo (FI); Waikwok Kwong, Solna (SE); Jose Luis Pradas, Stockholm (SE)

(73) Assignee: Optis Wireless Technology, LLC, Plano, TX (US)

( * ) Notice: Subject to any disclaimer, the term of this patent is extended or adjusted under 35 U.S.C. 154(b) by 162 days.

(21) Appl. No.: 13/696,356

(22) PCT Filed: Sep. 27, 2012

(86) PCT No.: PCT/SE2012/051024
§ 371 (c)(1),
(2) Date: Nov. 6, 2012

(87) PCT Pub. No.: WO2013/048320
PCT Pub. Date: Apr. 4, 2013

(65) Prior Publication Data
US 2013/0142076 A1  Jun. 6, 2013

Related U.S. Application Data
(60) Provisional application No. 61/541,198, filed on Sep. 30, 2011.

(51) Int. Cl.
| H04L 12/28 | (2006.01) |
| H04W 24/00 | (2009.01) |
| H04L 12/24 | (2006.01) |
| H04L 12/751 | (2013.01) |
| H04L 12/701 | (2013.01) |
| H04L 1/18 | (2006.01) |
| H04L 1/00 | (2006.01) |

(52) U.S. Cl.
CPC ............. *H04W 24/00* (2013.01); *H04L 41/12* (2013.01); *H04L 45/02* (2013.01); *H04L 45/00* (2013.01); *H04L 1/1822* (2013.01); *H04L 1/1896* (2013.01); *H04L 2001/0093* (2013.01)

(58) Field of Classification Search
CPC .............................. H04L 5/00; H04L 2001/00
See application file for complete search history.

(56) References Cited

U.S. PATENT DOCUMENTS

| 2007/0223405 A1 | 9/2007 | Jiang et al. |
| 2009/0141675 A1* | 6/2009 | Sebire et al. .................. 370/329 |
| 2009/0225709 A1* | 9/2009 | Wager et al. .................. 370/329 |

FOREIGN PATENT DOCUMENTS

| EP | 1 909 425 A1 | 4/2008 |
| WO | WO 2006/100597 | 9/2006 |
| WO | WO 2008/024340 | 2/2008 |

OTHER PUBLICATIONS

International Search Report and Written Opinion mailed Apr. 16, 2013 in International Application No. PCT/SE2012/051024.
3GPP TS 25.212 V10.1., Technical Specification, 3$^{rd}$ Generation Partnership Project; Technical Specification Group Radio Access Network; Multiplexing and Channel Coding (FDD) (Release 10) (Dec. 2010).

* cited by examiner

*Primary Examiner* — Timothy J Weidner
*Assistant Examiner* — Jana Blust
(74) *Attorney, Agent, or Firm* — Vincent J. Allen; Austin C. Teng; Carstens & Cahoon, LLP

(57) ABSTRACT

Embodiments herein relate to a method in a network node (12,14) for signalling Hybrid Automatic Repeat Request, HARQ, configuration for a common enhanced dedicated channel configuration in a radio communications network (1). The network node (12,14) is comprised in the radio communications network (1) and serves a user equipment (10). The network node (12,14) determines a state of a HARQ process of a transmission time interval out of a number of HARQ processes for a common enhanced dedicated channel configuration. The state is defining whether the HARQ process is active or inactive. The network node (12,14) signals the HARQ configuration for the common enhanced dedicated channel configuration by broadcasting a value representing the state of the HARQ process.

30 Claims, 10 Drawing Sheets

NETWORK NODE, USER EQUIPMENT AND METHODS THEREIN

This application is the U.S. national phase of International Application No. PCT/SE2010/051024, filed 27 Sep. 2012, which designated the U.S. and claims the benefit from U.S. Provisional Application No. 61/541,198, filed 30 Sep. 2011, the entire contents of each of which are hereby incorporated by reference.

TECHNICAL FIELD

Embodiments herein relate to a network node, a user equipment and methods therein. In particular, embodiments herein relate to signal or determine Hybrid Automatic Repeat Request configuration in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In 3rd Generation Partnership Project (3GPP) Release (Rel)-11, work is ongoing to improve the end user experience and performance especially in a CELL_FACH state. CELL_FACH state is a Radio Resource Control (RRC) state in which the user equipment is known on a cell level, i.e. has a cell ID, has a layer 2 connection but no dedicated physical layer resource. Instead, common physical layer resources are shared between user equipments in CELL_FACH state, whereas in CELL_DCH state user equipments have a dedicated physical resource.

Enhanced Dedicated Channel (E-DCH) may also be deployed in CELL_FACH state which is normally used as a dedicated channel in CELL_DCH state with one separate resource allocated per user equipment. In CELL_FACH state, this is performed by having a pool of E-DCH resources that may be temporarily assigned to a user equipment in CELL_FACH state. There resources may be called common E-DCH resources. Common E-DCH resources are normally managed by a Radio Network Controller (RNC) controlling one or more radio base station, but the pool of common E-DCH resources may be managed by the radio base station also referred to as NodeB. The common E-DCH configurations are broadcasted by the radio base station to user equipments in the cell.

The procedure to access the common E-DCH channel in CELL_FACH state starts in the same way as Release-99 Random Access Channel (RACH) transmission, i.e. with preamble power ramping using randomly selected preamble signatures. Having detected the preamble, the NodeB acknowledges reception with an Acquisition Indicator Channel (AICH) sequence. The NodeB also informs the user equipment which common E-DCH resource it has assigned to the user equipment.

A common E-DCH resource is defined as or comprises
UL scrambling code
E-DCH Radio Network Temporary Identifier (E-RNTI)
Fractional-Dedicated Physical Channel (F-DPCH) code
and timing offset E-DCH Absolute Grant Channel
(E-AGCH)/E-DCH-Relative Grant Channel
(E-RGCH)/E-DCH Hybrid Automatic Repeat Request
(HARQ) Acknowledgement Indicator Channel
(E-HICH) codes and signatures; and parameters for use
by the user equipment in uplink High-Speed Dedicated
Physical Control Channel (HS-DPCCH) transmissions,
such as power offsets and Channel Quality Report configuration information, e.g. a Channel Quality Indicator
(CQI).

CELL_FACH state in Release 10 of 3GPP is a state commonly used for battery and radio efficient use of radio resources for user equipments in which data typically arrive in bursts with longer idle periods in between. Ideally, a user equipment should be inactive between the bursts but still be capable of swiftly moving into an active state when there are packets to send or receive. For this kind of on-off type traffic patterns, the connection set-up latency and signaling load has a significant impact both on the preservation of the battery of the user equipment and on the transmission quality perceived by the end user of the user equipment.

E-DCH resource configurations are broadcasted in System Information Block 5 (SIB5). Some of the broadcasted parameters are common for all common E-DCH resources, for instance the Time Transmission Interval (TTI) configuration. E-DCH as specified nowadays may have two TTI configuration: 2 ms and 10 ms transmissions. The 2 ms TTI E-DCH uses a total of 8 HARQ independent or individual processes meanwhile 10 ms TTI uses 4 HARQ independent or individual processes.

The deployment of 2 ms TTI in CELL_DCH state allows the possibility of activate or deactivate HARQ individual processes by the means of absolute grants, this possibility is not available for the 10 ms configuration. The activation/deactivation of HARQ processes provides to the network, e.g. Radio network Controller (RNC) or NodeB, with more flexibility to schedule rates and steer interference of the UE's transmissions. The activation/deactivation is done by means of the Absolute Grant Channel (AGCH), which signals to a specific user equipment a grant with two parameters; SCOPE parameter and GRANT parameter. Upon reception of an AGCH signal, the user equipment applies the GRANT parameter to the HARQ processes specified by the SCOPE parameter. The SCOPE parameter may be "ALL" or "Per-HARQ"; meaning that the grant applies to all the HARQ processes or to one specific process, e.g. the timing of the reception will determine which process is affected. The GRANT parameter, also referred to as GRANT value, may be mapped to the absolute grant table specified on table 16B and 16B.1 of 3GPP 25.212, version 10.1.0, see Table 1 below. If the GRANT value is equal to "INACTIVE" the HARQ process(es) referenced by the SCOPE parameter are deactivated. An active HARQ process indicates transmission from the user equipment for that TTI, and inactive HARQ process indicates a non-transmission from the user equipment for that respective TTI.

TABLE 1

Absolute Grant Value defined by an index value

| Absolute Grant Value | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

In CELL_DCH state, the data flows, e.g. Medium Access Control-dedicated (MAC-d) flows, may be configured as scheduled or non-scheduled. The scheduled flows are transmitted following a set of rules specified in the transport format selection for E-DCH in 3GPP TS 25.321 version 10.3.0 based in scheduling grants that are transmitted to the user equipment by the network using the Absolute Grants Channels (AGCH), the Relative Grant Channels (RGCH) and the initial configuration message.

The scheduling grants limit the quantity of power that the user equipment may use to transmit data of the scheduled flows which is translated in a data rate when the user equipment power configuration is applied as well. Meanwhile, the non-scheduled flows are transmitted based in a non-schedule grant that is specified in the flow configuration message. The grant is in practice a limitation in the number of bits per Medium Access Control-enhanced (MAC-e) Packet Data Units (PDU) that can be used by the configured non-scheduled flow. The grant may be defined as a maximum power offset allowed to be used for the data transmission part that can be translated in a limitation in the number of bits. Non-scheduled flows are transmitted according to the absolute priority rules with respect to all the other flows and not needing to follow the current scheduling grant, but the initially specified non-scheduled grant. One important difference of schedule and non-schedule grants is that the AGCH and RGCH are controlled by the NodeB meanwhile an initial configuration used to configured the flow, schedule and non-schedule, are controlled by the RNC. The initial configuration permits to specify what processes are allowed to be used to transport non-scheduled data and what processes could transmit scheduled data from the scheduled flows. The initial configuration uses a HARQ process bitmap based in the process-Id to identify what process are allowed to send schedule or non-schedule data. This type of initial configuration is not available for CELL_FACH common E-DCH resources and the division between scheduled and non-scheduled data is not present either.

The expected increase in the number of user equipments in the CELL_FACH state added to the bursty, scatter with high packet size diversity characteristics of the traffic displayed by the majority of the smartphone type of user equipments makes the network resources a critical asset which requires and optimal handling.

By deactivating some of the HARQ processes in the 2 ms TTI Enhanced Uplink (EUL) transmissions, the network is available to utilize better its resources and support a higher number of user equipments' transmissions than allowing transmissions with all the HARQ processes. This is not possible in CELL_FACH state today since the scope of the absolute grants for the transmissions of EUL in CELL_FACH as introduced in Rel-8 will always apply to all HARQ processes. Even when the same mechanisms applied for CELL_DCH state are possible to be used to deactivate dynamically some of the HARQ processes this cannot be applied fully until the network has fully acknowledge the user equipment, after contention resolution phase, and therefore the initial state of the HARQ processes needs to be configured in advance. The initial configuration used in CELL_DCH state does not apply for directly activating or deactivating HARQ processes but to allow transmission of schedule and non-schedule data, concepts that are not defined for CELL_FACH state. A very basic signaling has been suggested but with an added overhead (size) of the signaling. The relative broadcasted signaling as specified in 3GPP TS 25.331 version 10.4.0 section 10.3.6.9a Common E-DCH system info. Using a dedicated signalling of the HARQ configuration, results in an increased usage of radio resources that also reduces performance of the radio communications.

SUMMARY

It is today not stated how to configure a state e.g. the initial state of HARQ processes for E-DCH in e.g. CELL_FACH state, and also not how to configure the state, e.g. the initial state, of HARQ processes when user equipment capability is unknown before contention resolution. Therefore, according to embodiments herein an object is to configure common E-DCH in an efficient manner without reducing the performance of the radio communications network.

According to an aspect of embodiments herein, the object is achieved by a method in a user equipment for determining HARQ configuration for a common enhanced dedicated channel configuration in a radio communications network. The user equipment is served by a network node comprised in the radio communications network. The user equipment receives a value broadcasted from the network node. The value is representing a state of a HARQ process out of a number of HARQ processes for the common enhanced dedicated channel configuration. The user equipment determines the HARQ configuration for the common enhanced dedicated channel configuration by deriving from the received value whether a HARQ process for a transmission time interval is active or inactive.

According to another aspect of embodiments herein, the object is achieved by a method in a network node for signalling HARQ configuration for a common enhanced dedicated channel configuration in a radio communications network. The network node is comprised in the radio communications network and serves a user equipment. The network node determines a state of a HARQ process of a transmission time interval out of a number of HARQ processes for a common enhanced dedicated channel configuration. The state is defining whether the HARQ process is active or inactive. The network node signals the HARQ configuration for the common enhanced dedicated channel configuration by broadcasting a value representing the state of the HARQ process.

According to yet another aspect of embodiments herein, the object is achieved by a user equipment for determining HARQ configuration for a common enhanced dedicated channel configuration in a radio communications network. The user equipment is configured to be served by a network node comprised in the radio communications network. The user equipment 10 comprises a receiver circuit configured to receive a value, broadcasted from the network node. The value represents a state of a HARQ process out of a number of HARQ processes for the common enhanced dedicated channel configuration. The user equipment further comprises a processing circuit configured to determine HARQ configuration for the common enhanced dedicated channel configuration by deriving, from the received value, whether a HARQ process for a transmission time interval is active or inactive.

According to still another aspect of embodiments herein, the object is achieved by a network node for signalling HARQ configuration for a common enhanced dedicated channel configuration in a radio communications network. The network node is arranged to be comprised in the radio communications network and to serve a user equipment. The network node comprises a processing circuit configured to determine a state of a HARQ process of a transmission time interval out of a number of HARQ processes for a common enhanced dedicated channel configuration. The state is defining whether the HARQ process is active or inactive. The network node further comprises a transmitter circuit configured to signal HARQ configuration for the common enhanced dedicated channel configuration by broadcasting a value representing the state of the HARQ process.

By providing a value that is broadcasted indicating active/inactive HARQ processes, the user equipment is enabled to transmit data in the TTI indicated as an active HARQ process without having to wait for a dedicated transmission indicating HARQ configuration. Thus, the performance is enhanced as data may be transmitted more quickly from the user equipment.

BRIEF DESCRIPTION OF THE DRAWINGS

Embodiments will now be described in more detail in relation to the enclosed drawings, in which.

DETAILED DESCRIPTION

Figure 1:
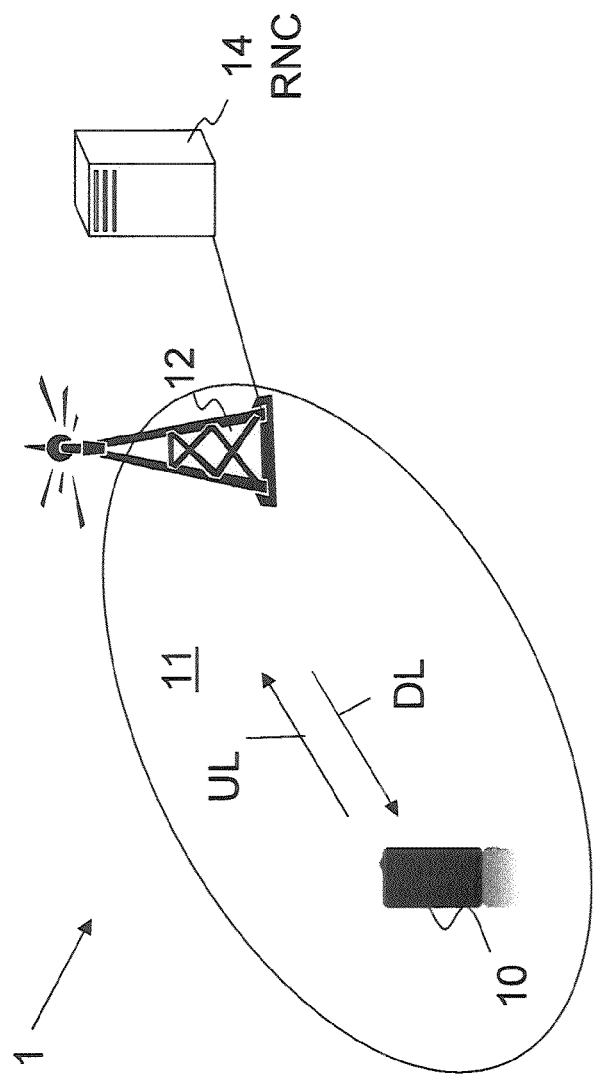
FIG. 1 is a schematic block diagram depicting a radio communications network.

FIG. 1 shows a radio communications network 1, such as a network of WCDMA, GSM/EDGE, WiMax, LTE, LTE-Advanced or UMB, just to mention a few possible implementations. Thus, the radio communications network 1 may be any cellular radio network e.g. comprising a controlling radio network node, capable of establishing and routing a data packet session through different network transmission paths exploiting different routing protocols. The radio communications network 1 may e.g. be a Universal Mobile Telecommunications System (UMTS) Terrestrial Radio Access Network (TRAN) (UTRAN)-General Packet Radio Service (GPRS) network, a WCDMA network, a Code Division Multiple Access (CDMA) 2000 network, an Interim Standard (IS)-95 network, a Digital-Advance Mobile Phone Service (D-AMPS) network etc. The radio communications network 1 serves a user equipment 10. It should be understood that the term "user equipment" is a non-limiting term which means any wireless terminal, device or node e.g. Personal Digital Assistant (PDA), laptop, mobile terminal, mobile, sensor, relay, mobile tablets, a Location Services (LCS) target device in general, an LCS client in the network or even a small base station.

The radio communications network 1 comprises a radio base station 12 providing radio coverage over at least one geographical area forming a cell 11. The radio base station 10, which is and example of a network node, may also be referred to as e.g. a NodeB, an evolved Node B (eNB or eNode B), a base transceiver station, Access Point Base Station, base station router, or any other network unit capable to communicate with the user equipment 10 within the cell 11 depending e.g. of the radio access technology and terminology used. Also, the radio base station 12 may further serve one or more cells. Other examples of network nodes serving the user equipment 10 are relay nodes or beacon nodes.

The cell definition may also incorporate frequency bands used for transmissions, which means that two different cells may cover the same geographical area but using different frequency bands. One, or more, user equipment 10 is served in the cell 11 by the radio base station 12 and may be communicating with the radio base station 12. The user equipment 10 transmits data over an air or radio interface to the radio base station 12 in uplink (UL) transmissions and the radio base station 12 transmits data over an air or radio interface to the user equipment 10 in downlink (DL) transmissions. The radio communications network 1 may further comprise another network node, a controlling network node such as a Radio Network Controller (RNC) 14, controlling the radio base station 12. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realized in the Base Station Controllers (BSC) of the CDMA 2000 network.

According to embodiments of methods herein, active or inactive states of each HARQ process of a common E-DCH are broadcasted within the cell 11. As stated above, an active HARQ process indicates where a user equipment may transmit data. Some embodiments relate to signalling, from the radio base station 12 or the RNC 14, an initial state of the HARQ processes of a common dedicated channel such as a common E-DCH. The state indicates what process that may be used to "send" data. The state consequently indicates what TTI the user equipment 10 is allowed to send data in since common E-DCH is a synchronized channel; the process transmits in order from 0 to 7, one process per TTI for 2 ms TTI but may be different for other TTI configurations.

The method to signal the state the HARQ processes for common E-DCH comprises two parts. One is a configuration that the network node, e.g. the radio base station 12 or the RNC 14, transmits to the user equipment 10 by broadcasting the information to all the user equipments in the cell 11. A second part is the actions that are required to be performed by the user equipment 10 in order to interpret the information received from the radio base station 12 or the RNC 14. E.g. since a value that is broadcasted indicates active/inactive HARQ processes, the user equipment 10 is enabled to transmit data without having to wait for a dedicated transmission indicating the HARQ configuration.

Some embodiments disclose that all HARQ processes of the common E-DCH start activated with a default grant or alternatively one HARQ process of the common E-DCH is activated with a default grant. It should be noted that it may be more than one HARQ process at a time. This may apply to the configuration of one common E-DCH resource at the time. It should be noted that some resources may follow a default value for the HARQ processes but other resources may have a specific configuration of the HARQ processes for that resource.

Figure 2:
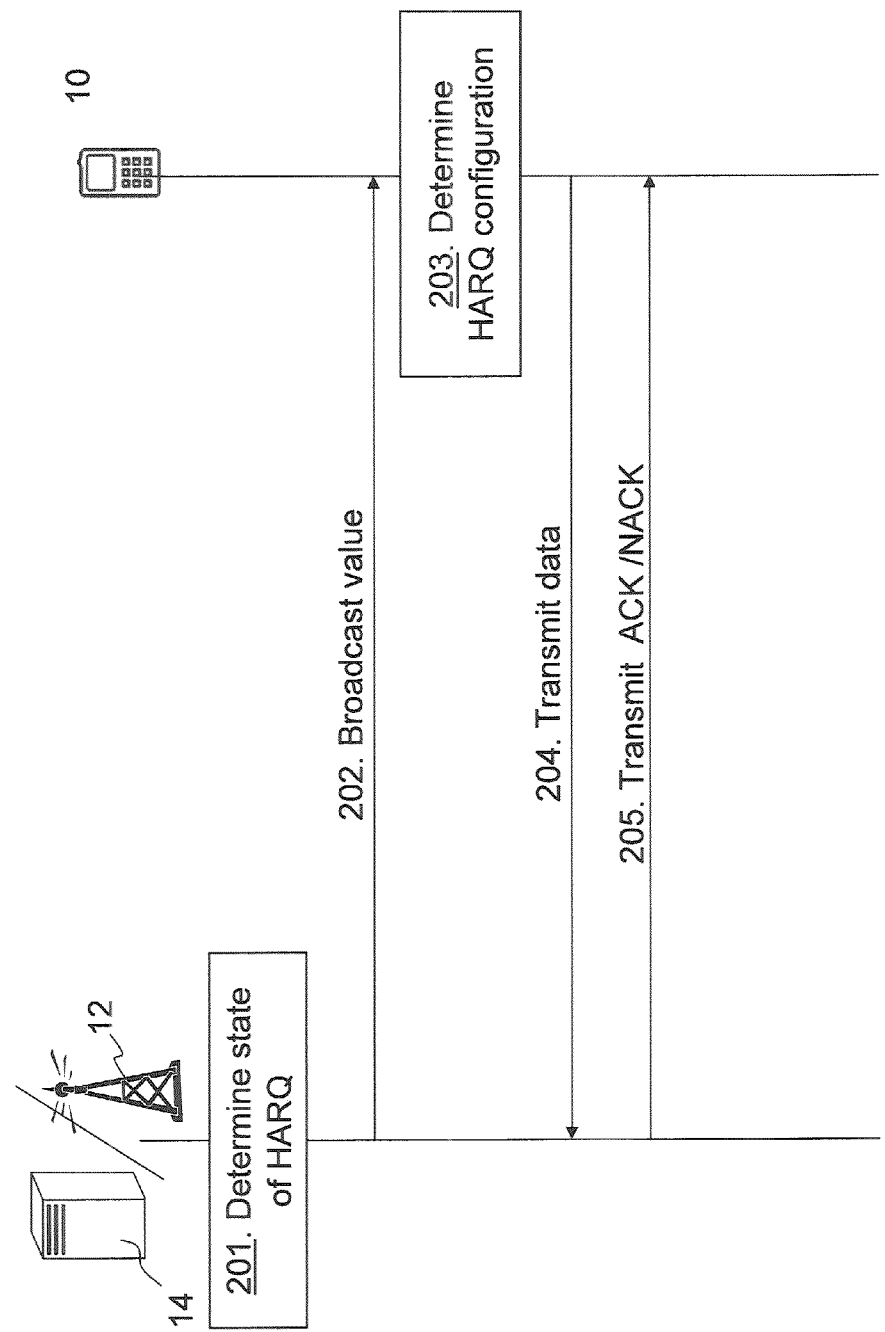
FIG. 2 is a combined flowchart and signalling scheme depicting embodiments herein.

FIG. 2 is a combined flowchart and signaling scheme in the radio communications network 1 according to embodiments herein.

Action 201. The network node, in this example the radio base station 12, but may alternatively be the RNC 14, determines a e.g. initial state of HARQ activations. E.g. the RNC 14 determines which processes of a specific configuration will be active or inactive. This means which processes will be used to transmit data or not in CELL_FACH State if such specific configuration is used by the user equipment 10. The RNC 14 may receive an access request and based on the request the RNC 14 may determine a resource that is related to a certain HARQ configuration. As the HARQ configuration is related to a resource, different user equipments will be scheduled different resources and thus different HARQ configurations. Thus, interference and load situations may be taken into account when determining HARQ activations. One HARQ process is related to one TTI. Nowadays there is being introduced more HARQ processes because of multiple antennas and multiple carriers. Thus, one HARQ process may correspond to one transmission in a TTI. Since even when there is possibility for several HARQ processes to transmit in the same TTI, the HARQ processes correspond to other frequencies, and are controlled by their own dedicated signalling from a dedicated scheduler.

Action 202. The radio base station 12 broadcasts the value indicating e.g. initial state of HARQ configuration to the user equipment 10. E.g. radio base station 12 transmits a configuration message that signals the state of the HARQ processes. The indication of the state or the bit string may be sent in any Information Element (IE) and may e.g. be part of the >>Common E-DCH Resource Configuration information list IE and the bitmap in the Common E-DCH System Info IE, see table 3 below, or it may use its own IE for 2 ms TTI configurations.

Action 203. The user equipment 10 receives the transmitted value or state in a configuration message and derives the state from the configuration message. Thus, upon reception of the configuration message, the user equipment 10 is able to derive e.g. the initial state of the HARQ processes for the common-EDCH configurations. For example, the user equipment may derive a bitmap indicating which HARQ processes of the E-DCH channel, of which TTIs, that are to be used, or a second bit indicating that a bit shift of the bitmap is to be used to determine initial state of the activation of the HARQ process. The bit shift may be used to make sure that some of the configurations provided could repeat the same HARQ value as a previous one if the network wishes.

Action 204. The user equipment 10 may then transmit data to the radio base station 12 using the active HARQ processes. The TTI corresponding to inactive processes does not have data transmission from the user equipment 10.

Action 205. The radio base station 12 may transmit Acknowledgments (ACK) or non-Acknowledgments (NACK) to acknowledge or not acknowledge the processes over which TTIs data is transmitted.

Embodiments herein states that initial state of the HARQ processes for E-DCH, e.g. 2 ms, 10 ms or similar, is signaled trough a value representing the state of the HARQ processes from the radio base station 12 or the RNC 14. The value may be deployed after a bit shift operation taking in account the E-DCH resource index and if required additional configured parameters. The final result of the bit shift operation is a bitmap indicating which HARQ processes are active and which HARQ processes are inactive for each E-DCH configuration, e.g. common (C)-E-DCH configuration or dedicated-E-DCH configuration.

Thus, a network node for managing resources may signal a state such as an initial state of an HARQ process corresponding to a time transmission interval transmission, which state indicates the HARQ process to be activated or deactivated meaning that a transmission is allowed or not for the corresponding transmission time interval. The user equipment 10 receives and may then derive the state of the HARQ process for one or more TTIs.

Embodiments herein allows the network node, i.e. the radio base station 12 or the RNC 14, to specify the state of the HARQ processes of the e.g. common E-DCH 2 ms TTI user equipments even before the network has knowledge of capabilities of the user equipment 10, e.g. before contention resolution. Therefore the network node is able to control and steer the noise rise and resource utilization in an effective and simple way.

Some embodiments allow a more compressed version of the signaling that is required to be sent to the user equipment 10. Specially, by deploying broadcasting, the reduction in signaling is very appreciated and necessary. More detailed configurations keeping equal or even further signaling size reduction is enabled by the rest of the embodiments herein.

Interpreting the HARQ Process State Configuration in the User Equipment 10

The user equipment 10 implementing the method to interpret state of the HARQ process of common E-DCH configuration, after receiving the configuration information from the radio base station 12, may:

Derive a signaled value and use the signaled value for HARQ process state as a bitmap mapped to each of the E-DCH HARQ processes, were the position of the bits of the value signaled corresponds to each of the HARQ processes indexes and the value of the bit would indicate if the process is initially activated or not.

In certain cases of not specifying any value, the user equipment 10 assumes that all the configuration(s) HARQ processes initial state is ACTIVE and therefore follows the given transmission grant. A default state of the HARQ processes may be agreed beforehand between the RNC 14 or the radio base station 12 and the user equipment 10.

In some embodiments, the user equipment 10 may receive a bitmap value for the initial state of its HARQ processes that is considered the value, also referred to as a reference value, and requires to be processed in order to be used according to the method of the above described procedure. After receiving the value such as a reference value or a default value, the user equipment 10 may in these embodiments:

Apply a bit shift, e.g. circular shift, operation to the value. The bit shift may be based in the specific common-EDCH resource index and/or the scrambling code, after applying modulus eight, and/or derivation of a scrambling code, after an operation for the scrambling code configured to be used by the user equipment 10. A final result of shifting the bits in the reference value bitmap is used as the bitmap signaling the state of the E-DCH HARQ processes of the resource which index is to be used in the operation. The bit shift may be done in any direction, left or right, as long as agreed by the RNC 14 or the radio base station 12 and the user equipment 10. For example, for a Common-EDCH configuration of index '12' and a reference bitmap with value '2', then the result on bit operation is:

$N$=Number of HARQ process (8)

$x$=2(00000001), same number of bits as $N$ $i$=12 (index of Common-EDCH configuration)

$i \bmod N$=4→HARQ process state=$(x>>4)|(x<<(N-4))$=00010000

Meaning that the initial state of the process with HARQ proc-Id 3 should be active and the rest inactive and this applies only to the E-DCH configuration of index 12.

In some embodiments, the operation will be executed if an additional value such as a bit, e.g. the second bit, is signaled from the RNC 14 or the radio base station 12 indicating so. In these embodiments, the absence of the bit would indicate to the user equipment 10 that the method is not to be applied for the E-DCH configuration and therefore all the HARQ processes of such configuration are considered active, or that if the second bit is not active/signalled, a previous configuration should be taken in account.

E.g. in case of the second bit being present, then the value of the second bit would determine if the user equipment 10 is to use the circular shift as indicated in the action above or use the reference value as an absolute value without applying the circular shift for the given configuration. This may also be signalled by a total absence of the bit. E.g. if the configuration parameter is absent the user equipment 10 may assume that the value of the bit for the previous configuration is to be read and apply to the current HARQ configuration. There could also be an agreed default, that even if no configuration is explicitly present, it will have a meaning. E.g. if the default value for the bit is 1, and the bitmap is 256, all the processes are active, then all the other configurations will use the shifting operation if not changed in some configuration. Even when the bitmap change, if the flag/bit does not change explicitly, the user equipment 10 continues applying the default HARQ configuration.

Additionally or alternatively, the reference value might be found by the user equipment 10 directly in one specific configuration instead of a default value applying for all the configurations. If this is the case, the user equipment 10 assumes that the last read reference value, from the sequential list of E-DCH configurations, applies to all the subsequent configurations until a new value is found.

In some further embodiments, the reference value might be signaled based on a reduced set of possibilities that represent a specific state of one or more HARQ processes that has been agreed by the network and the user equipment implementations or as a result of applying a formula. This subset may have an index or enumeration assigned and it is recognized by the user equipment 10 and translated in the same reference bitmap mentioned previously. Such bitmap will be subject of the procedures already mentioned in this description. The formula option may define the activated HARQ processes by:

Activated HARQ process=(common E-DCH resource list position×$Nr$ of Activated HARQ+$I_n$) mod 8

Where

'common E-DCH resource list position' corresponds to the index of the C-EDCH resource, 'Nr of Activated HARQ' is a number of consecutive HARQ processes that will be active $I_n$ corresponds to a loop from 0 to Nr of Activated HARQ−1

The final result 'Activated HARQ process' will be a vector indicating the index of the HARQ processes that will be active in the reference value.

For example:

If Nr of HARQ processes=3 then:

Resource 0→active HARQ processes [0 1 2]

Resource 1→active HARQ processes [3 4 5]

Resource 2→active HARQ processes [6 7 0]

Resource 3→active HARQ processes [1 2 3]

. . .

Figure 3:
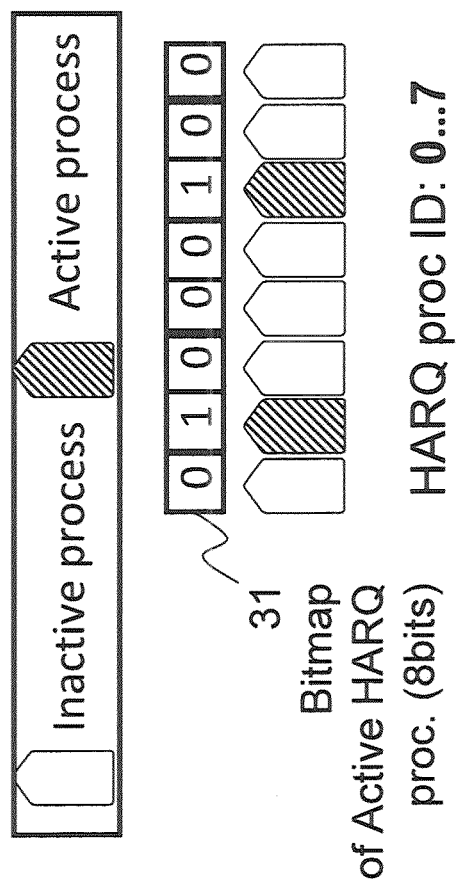
FIG. 3 shows Specific HARQ process state bitmap signalling.
Figure 4:
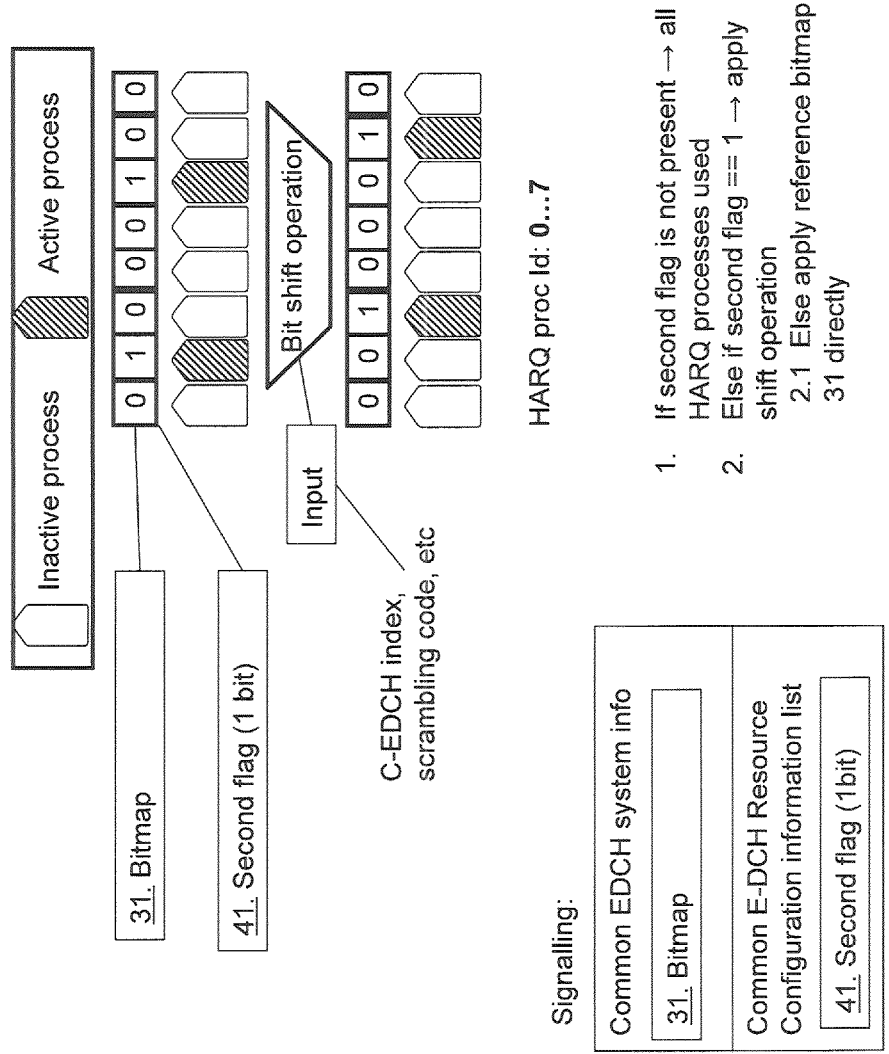
FIG. 4 shows an implementation example of signalling for E-DCH HARQ process initial state by a reference value.

This can be map to the reference bitmap as indicated in FIG. 4 or Specific HARQ process state bitmap FIG. 3.

FIG. 3 is a schematic overview of signaling of e.g. the initial E-DCH HARQ process state of each HARQ process by the network node, e.g. the radio base station 12 or the RNC 14.

The information that is sent by the network node requires in the example a bitmap 31 of Active HARQ processes representing HARQ process-IDs. In the case of 2 ms TTI user equipments HARQ process-IDs are eight, as shown in FIG. 3. The bitmap 31 is represented in this case by 8 bits, each bit setting whether a HARQ process for a TTI is active or not active/inactive.

An active HARQ process is marked with diagonal lines and an inactive HARQ process is not marked. The bitmap 31 of Active HARQ process of eight bits comprises the value 01000100. This value indicates HARQ proc Id 1 and HARQ proc Id 5, of HARQ proc ID 0-7, are active HARQ processes.

Additionally to the bitmap 31, since there are several common-E-DCH resources that would require an initial process state configuration, the radio base station 12 or the RNC 14 may indicate to use the signaled bitmap 31 as an absolute configuration for each specific E-DCH configuration, E-DCH configurations may be in CELL_FACH or not, i.e. common or dedicated, or to apply a method described below to determine the initial HARQ process state. For example, this indication may be represented by a flag bit or a first bit. The presence of the flag bit, either 0 or 1, in the configuration, signals to the user equipment 10 the need of applying the procedure to determine whether to use HARQ process or not; if the flag bit is not present, the radio base station 12 or the RNC 14 assumes that the user equipment 10 deploys a predefined configuration such as, "all the HARQ processes will be initially active" or use the previous resource configuration unless ordered differently.

In some embodiments, the radio base station 12 or the RNC 14 may assume that the individual configurations of the E-DCH resources are persistent to the further E-DCH resources configuration if not indicated differently. In the case of the initial HARQ process configuration for common resources, the E-DCH resources are configured in a sequential list and each common E-DCH resource applies or follows a configuration based on the previous resource configuration unless a specific configuration for the initial HARQ process state of that common E-DCH resource is indicated and the second flag bit is not found. For example, if the radio base station 12 or the RNC 14 has indicated the activation of HARQ proc-Id-1 for Common-E-DCH configuration with index 1, then the same configuration will apply for Common-E-DCH configuration with index 2 and so on, until a different configuration is found for a specific configuration and following the previous example, the presence of the specific configuration flag indicates a "non-all HARQ process active" configuration. Index here is a value to identify a specific Common-E-DCH configuration.

Additionally or alternatively, a further bit, e.g. a second bit, a second flag, or as indicated below the same first bit, an indication, such as a flag, may have a meaning for the network node, in order to signal the user equipment 10 to use directly the HARQ process state bitmap sent as a reference or with the opposite value to apply the bit shift operation described below to the reference bitmap in order to realize the HARQ process state configuration of the specific common E-DCH configuration.

FIG. 4 is a schematic overview depicting an example of an embodiment indicating to apply the bit shift operation. In the example, a reference value, also referred to as the value herein, is given in a higher/general level, but such a reference value may also be signaled in the specific configuration of the first Common-EDCH resource if required. One option is to signal a reference value in the form of the bitmap 31 that is updated in each Common EDCH configuration if required or present in the way of a Mandatory Default (MD). The bitmap 31 may signal the active and inactive processes. An active HARQ process is marked with diagonal lines and an inactive HARQ process is not marked. The exemplified Active HARQ process bitmap 31 of eight bits comprises the value 01000100. This value indicates that HARQ proc Id 1 and HARQ proc Id 5, of HARQ proc Id 0-7, are active HARQ processes. An additional bit, representing the first and second bit mentioned above denoted an second flag 41 or indication flag, may be used if required to shift the reference value a number of bits, for example based in the common-E-DCH resource (C-EDCH) index, scrambling code or the like. When the second bit is present a bit shift operation takes place. This results in a value of 00100010. This value indicates that HARQ proc Id 2 and HARQ proc Id 6, of HARQ proc Id 0-7, are active HARQ processes. The Common E-DCH system info may comprise Active HARQ processes as a bitmap reference of 8 bits. The common E-DCH Resource Configuration information list may comprise the second flag 41, also referred to as 2 m HARQ act/deact of 1 bit. E.g. if second flag is not set i.e. second flag is not present then all HARQ processes are used. Else if second flag 41=1 then shift operation is applied; else apply bitmap directly.

TABLE 3

Common E-DCH Resource Configuration
information list
>Soffset
>F-DPCH Code number TABLE 3-continued >E-RGCH Information
>HARQ info (only applying to 2 ms TTI configurations)
>>HARQ Allocation BIT STRING (SIZE (8)) MD
>>ARQ shifting BIT STRING (SIZE (1)) MD Table 3 shows a Common E-DCH Resource Configuration information list comprising a HARQ info IE. The HARQ info IE comprises a HARQ Allocation IE that comprises a first value indicating active/inactive HARQ processes as a bit-string of 8 bits; and a HARQ shifting IE that comprises a second bit indicating bit shift. The Common E-DCH Resource Configuration information list may further comprise a Soffset information element, a Fractional Dedicated Physical Control Channel (F-DPCH) code number, and an E-DCH-Relative Grant Channel (E-RGCH) Information Element.

Figure 5:
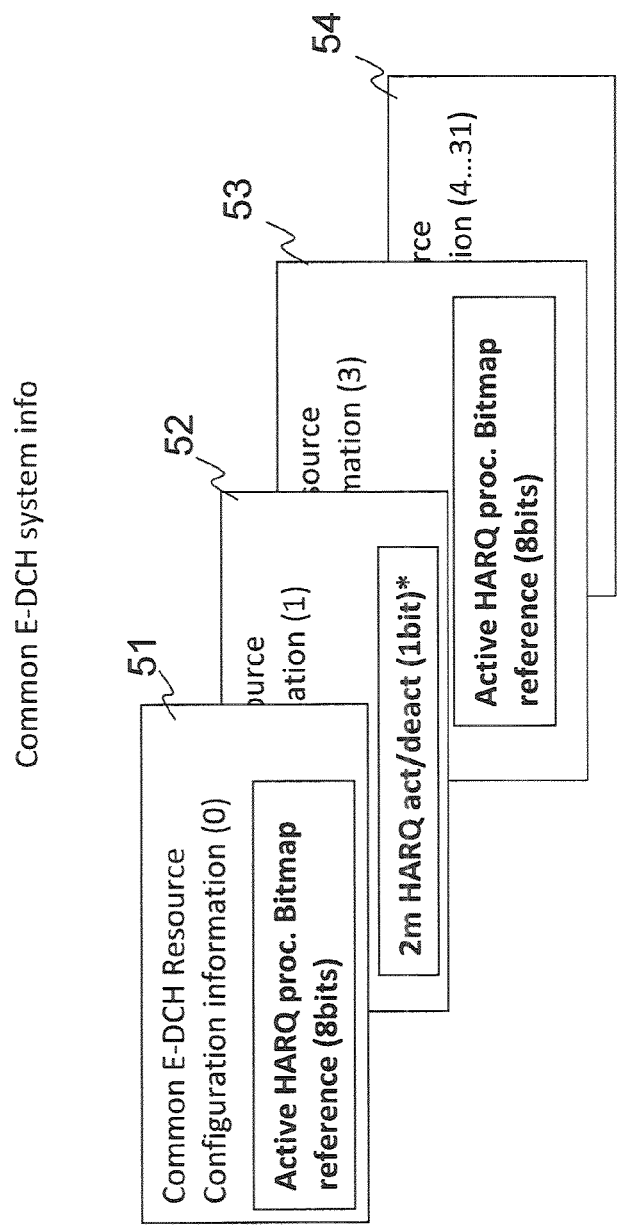
FIG. 5 shows an alternative signalling example for reference based HARQ process initial state.

FIG. 5 shows where a 'Common E-DCH configuration information (1)' 52 will have the same configuration or deduced from the value such as an Active HARQ process Bitmap reference of 8 bits present in a 'Common E-DCH configuration information (0)' 51 depending of the value of a flag, e.g. the second flag 41 above referred to as 2 m HARQ act/deact. Meanwhile a 'Common E-DCH configuration information (3)' 53 specifies a new value such as an Active HARQ process Bitmap reference of 8 bits that only apply to itself since the rest of the configurations information (4 . . . 32) 54 do not have the "per HARQ" state flag present, such as the second flag 41.

In some embodiments, the radio base station 12 or RNC 14 may substitute the reference bitmap for a limited set of values that may be mapped to HARQ processes states such as an index of stored bitmaps. The radio base station 12 or RNC 14 would signal an index value that is interpreted as the state of the HARQ processes by the user equipment 10 and apply the same provisions already described and the ones described below.

Figure 6:
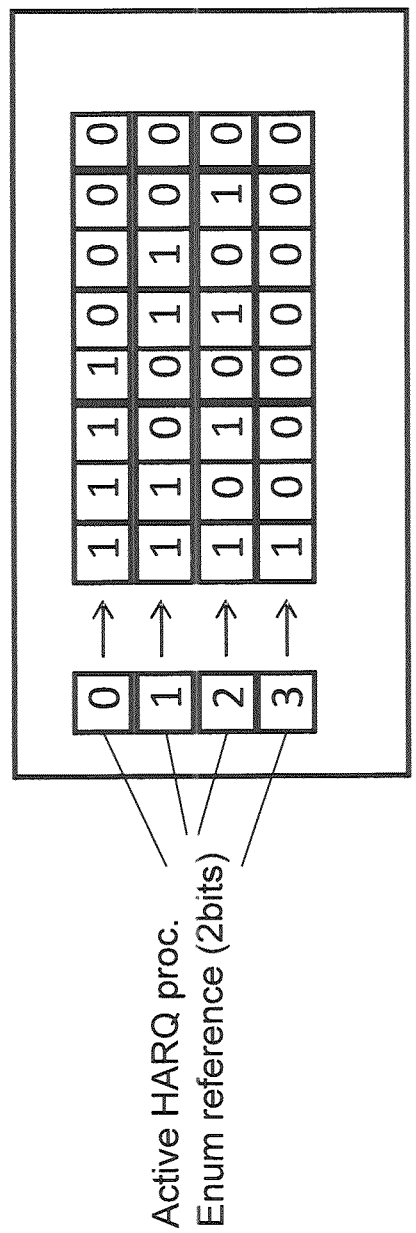
FIG. 6 shows an example of enumeration to signal HARQ process initial state.

One example of the configuration described in these embodiments is illustrated by FIG. 6, where the index value or enumeration determines activation or deactivation of HARQ processes. For example, a first value '0' of Active HARQ process Enumerated reference of 2 bits indicates a bitmap of an active HARQ process as 11110000; a second value '1' indicates a bitmap of an active HARQ process as 11001100; a third value '3' indicates a bitmap of an active HARQ process as 10101010; and a fourth '4' value indicates a bitmap of an active HARQ process as 10000000. Thus, a transmitted index of e.g. 2 bits may indicate four different HARQ configurations.

Figure 7:
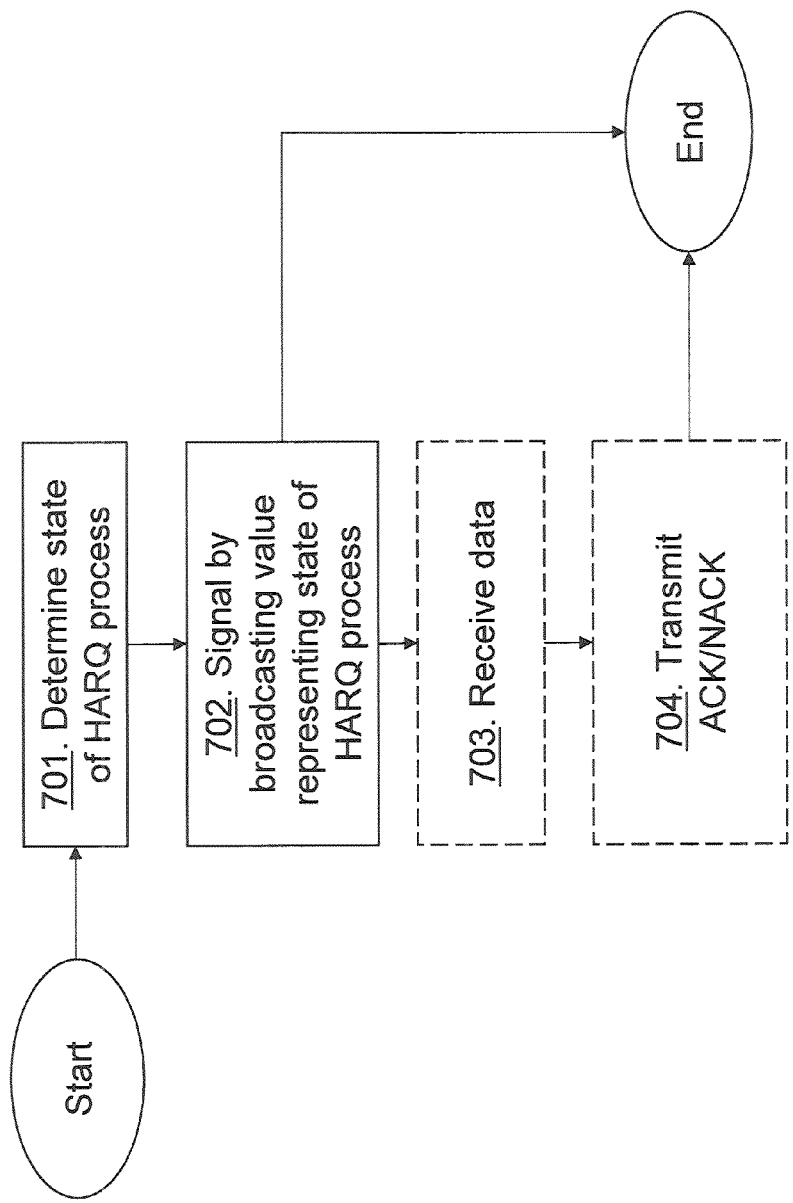
FIG. 7 is a schematic flowchart depicting a method in a network node according to embodiments herein.

FIG. 7 is a schematic flow chart depicting a method in the network node, such as the radio base station 12 or the RNC 14, according to embodiments herein for signalling HARQ configuration for the common E-DCH configuration in the radio communications network 1. The network node is comprised in the radio communications network 1 and serves the user equipment 10. The actions do not have to be taken in the order stated below, but may be taken in any suitable order and actions performed in some embodiments are indicated with dashed boxes.

Action 701. The network node determines the state of the HARQ process of the transmission time interval out of a number of HARQ processes for the common E-DCH configuration. The state is defining whether the HARQ process is active or inactive.

Action 702. The network node 12,14 signals the HARQ configuration for the common E-DCH configuration by broadcasting the value representing the state of the HARQ process. The value may be comprised in a bitmap. The bitmap comprises a number of bits where each bit represents a HARQ process out of a number of HARQ processes and indicates that the HARQ process for the transmission time interval is active or inactive. The network node may further transmit an additional value indicating whether to apply a bit shift operation to the bitmap. The network node may further transmit a flag bit indicating whether to use the determined HARQ configuration or a default HARQ configuration. The value may indicate a HARQ configuration previously used at the user equipment 10. The value may be comprised in a Common E-DCH Configuration Information list. Some embodiments herein are applied for a CELL_FACH state of the user equipment 10.

Action 703. The network node 12,14 may receive data from the user equipment over transmission time interval or intervals corresponding to active HARQ process or processes.

Action 704. The network node 12,14 may further transmit an Acknowledged and/or Not-Acknowledged indication or indications of the transmitted data for the transmission time interval or intervals.

Figure 8:
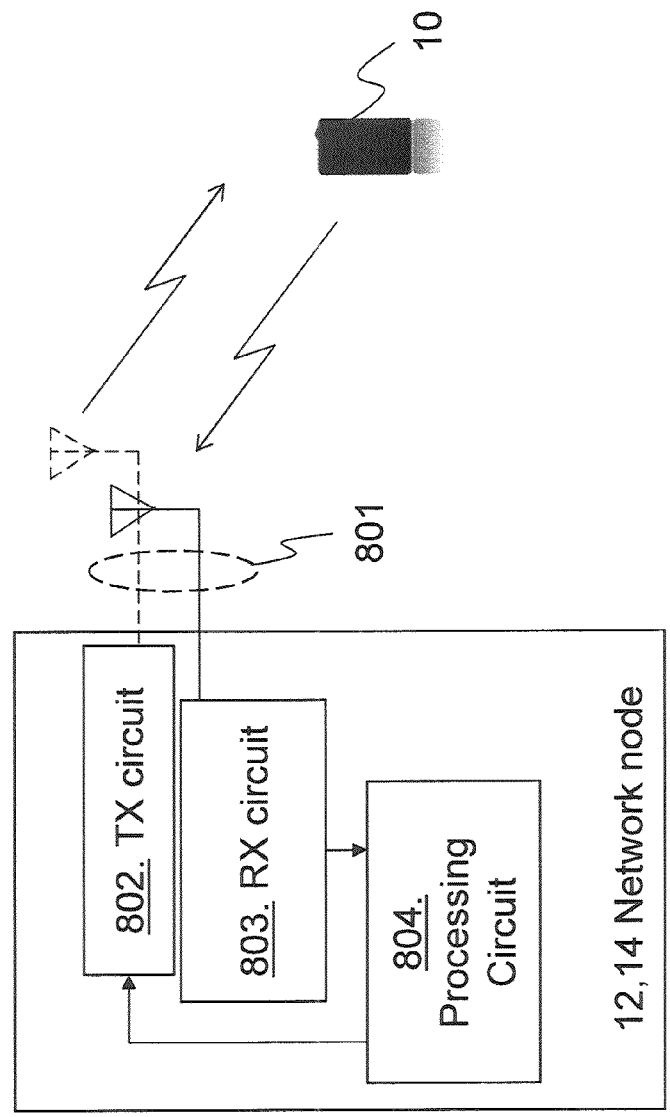
FIG. 8 is a block diagram depicting embodiments of a network node.

FIG. 8 shows the network node, e.g. the radio base station 12 or the RNC 14, that is configured to generally perform the method illustrated in FIG. 7. The network node may include one or more transmit/receive antennas 801, along with associated transmitter (TX) circuit 802 and receiver (RX) circuit 803, respectively, and includes one or more processing circuits 804 performing the method actions in the radio base station 12 or the RNC 14. The network node 12,14 for signalling the HARQ configuration for the common E-DCH configuration in the radio communications network 1 is disclosed in FIG. 8. The network node is arranged to be comprised in the radio communications network 1 and to serve the user equipment 10.

The processing circuit 804 is configured to determine the state, e.g. initial state, of the HARQ process of a transmission time interval out of a number of HARQ processes for a common E-DCH configuration. The state is defining whether the HARQ process is active or inactive. The transmitter circuit 802 is configured to signal HARQ configuration for the common E-DCH configuration by broadcasting the value representing the state of the HARQ process. The value may be comprised in a bitmap. The bitmap comprises a number of bits where each bit represents a HARQ process of a number of HARQ processes, and indicates that the HARQ process for the transmission time interval, respectively, is active or inactive.

The transmitter circuit 802 may further be configured to transmit an additional value indicating whether to apply a bit shift operation to the bitmap. The transmitter circuit 802 is further configured to transmit a flag bit indicating whether to use the determined HARQ configuration or a default HARQ configuration. The value may further indicate a HARQ configuration previously used at the user equipment 10. The value is comprised in a Common E-DCH Configuration Information list. The network node may be configured to apply for operation in a CELL_FACH state.

The receiver circuit 803 may be configured to receive data from the user equipment 10 over transmission time interval or intervals corresponding to active HARQ process or processes. The transmitter circuit 802 may then further be configured to transmit an Acknowledged and/or Not-Acknowledged indication or indications of the transmitted data for the transmission time interval or intervals.

Figure 9:
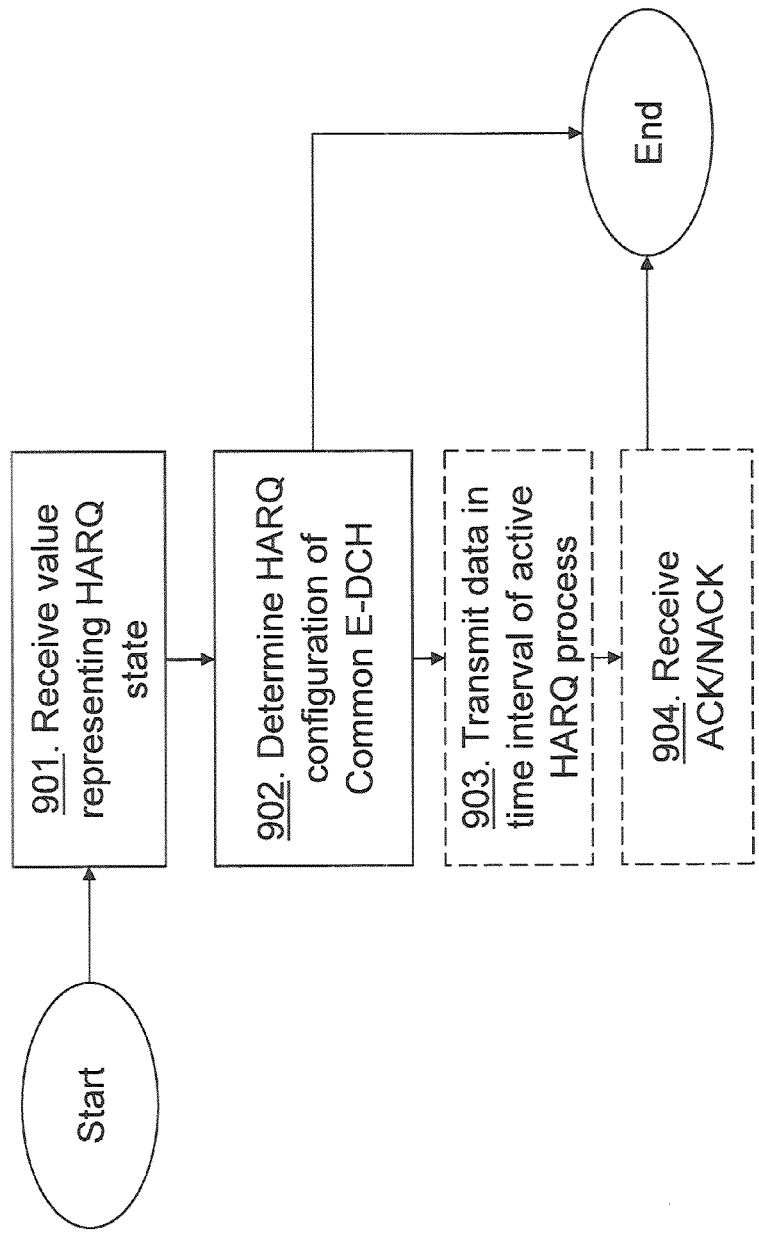
FIG. 9 is a schematic flowchart depicting a method in a user equipment according to embodiments herein.

FIG. 9 is a schematic flow chart depicting a method in the user equipment 10 according to embodiments herein for determining HARQ configuration for the common E-DCH configuration in the radio communications network 1. The user equipment 10 is served by the network node, e.g. radio base station 12 or radio network controller 14, comprised in the radio communications network 1. The actions do not have to be taken in the order stated below, but may be taken in any suitable order and actions performed in some embodiments are indicated with dashed boxes.

Action 901. The user equipment 10 receives a value, broadcasted from the network node 12,14. The value is representing the state of the HARQ process out of the number of HARQ processes for the common E-DCH configuration. In some embodiments, the user equipment 10 receives an additional value indicating whether to apply a bit shift operation to the bitmap. The user equipment 10 may further receive a flag bit indicating whether to use the determined HARQ configuration or a default HARQ configuration. The flag bit may be the additional value wherein a presence of the additional value indicates that the value or its bit shifted value should be used and the non-presence indicates that a default value of the HARQ configuration should be used. In some embodiments the value is comprised in a Common E-DCH Configuration Information list. The value may indicate a HARQ configuration previously used. In some embodiments a last read default value applies to all the subsequent HARQ configurations until a new value is found. The default value may be set indicating that transmission in one HARQ process is allowed.

Action 902. The user equipment 10 determines the HARQ configuration for the common E-DCH configuration by deriving from the received value whether a HARQ process for a transmission time interval is active or inactive. In some embodiments the user equipment 10 determines the HARQ configuration based on the received value and the received additional value. The value may be comprised in a bitmap, which bitmap comprises a number of bits where each bit indicates that a HARQ process for a transmission time interval is active or inactive. E.g. a bit string of 8 bits where each bit represents a HARQ process of a TTI. The user equipment 10 may use common physical layer shared resources shared between other user equipments served by the network node. Some embodiments are applied for a CELL FACH state of the user equipment 10.

Action 903. The user equipment 10 may then transmit data in a time interval or intervals, e.g. TTIs, corresponding to the active HARQ process or processes.

Action 904. The user equipment 10 may receive Acknowledged or Not-Acknowledged indications of the transmitted data.

Figure 10:
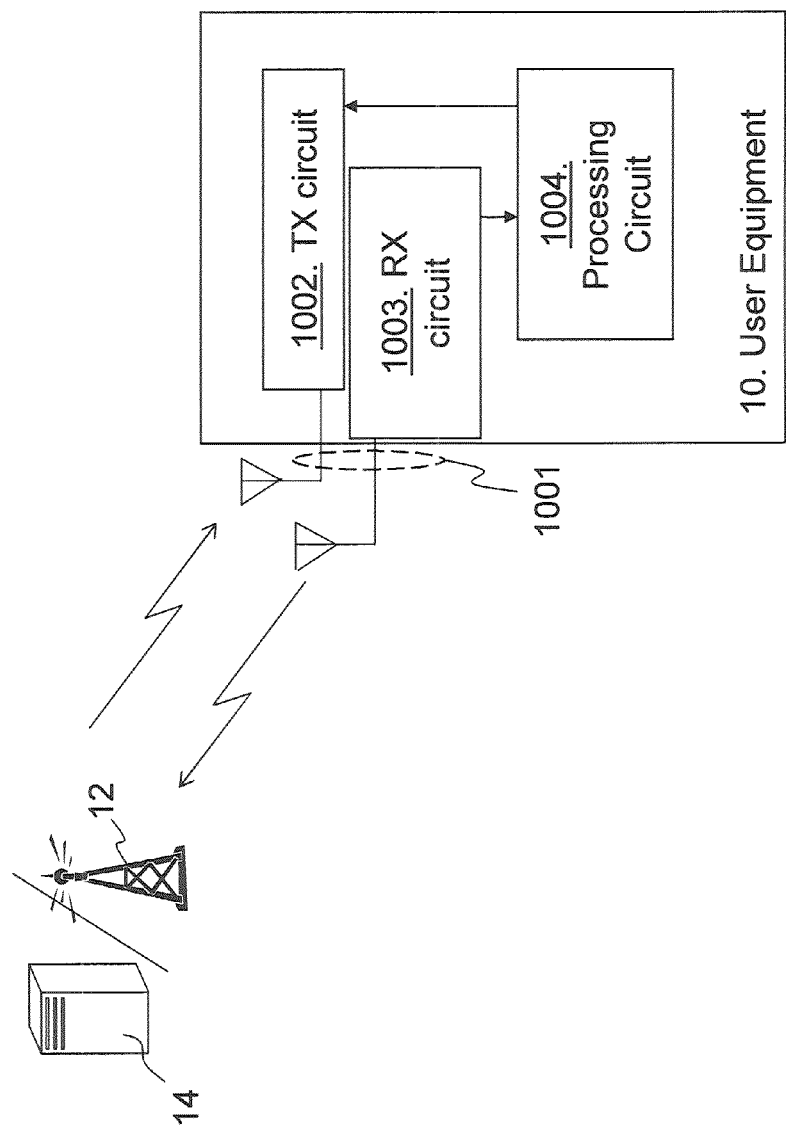
FIG. 10 is a block diagram depicting embodiments of a user equipment.

FIG. 10 shows the user equipment 10 that is configured to generally perform the method illustrated in FIG. 9. The user equipment 10 may include one or more transmit/receive antennas 1001, along with associated transmitter (TX) circuit 1002 and receiver (RX) circuit 1003, respectively, and includes one or more processing circuits 1004 performing the method actions in the user equipment 10. The user equipment 10 for determining HARQ configuration for the common E-DCH configuration in the radio communications network 1 is shown in FIG. 10. The user equipment 10 is configured to be served by the network node comprised in the radio communications network 1. The user equipment 10 comprises the receiver circuit 1003 that is configured to receive a value, broadcasted from the network node. The value represents a state of a HARQ process out of a number of HARQ processes for the common E-DCH configuration.

The user equipment 10 further comprises the processing circuit 1004 that is configured to determine HARQ configuration for the common E-DCH configuration by deriving, from the received value, whether a HARQ process for a transmission time interval is active or inactive. The value may be comprised in a bitmap, which bitmap comprises a number of bits where each bit indicates that a HARQ process for a transmission time interval is active or inactive. The receiver circuit 1003 may further be further configured to receive an additional value indicating whether to apply a bit shift operation to the bitmap. The processing circuit 1004 may then be configured to derive the HARQ configuration based on the value and the additional value. The receiver circuit 1003 may further be configured to receive a flag bit indicating whether to use the determined HARQ configuration or a default HARQ configuration. The value may be comprised in a Common E-DCH Configuration Information list. The user equipment 10 may further be configured to use common physical layer shared resources shared between other user equipments served by the network node. The transmitter circuit 1002 may be configured to transmit data in a transmission time interval or intervals corresponding to the active HARQ process or processes. The receiver circuit 1003 may then be arranged to receive Acknowledged or Not-Acknowledged indications of the transmitted data. The value may indicate a HARQ configuration previously used. The user equipment 10 may be configured to operate in a CELL FACH state. The user equipment may also be configured to apply a last read default value to all the subsequent HARQ configurations until a new value is found. The user equipment 10 may be configured to have a default value set indicating that transmission in one HARQ process is allowed.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The embodiments herein for activating or deactivating HARQ processes for an E-DCH may be implemented through one or more processors, such as a processing circuit 804,1004 in the user equipment 10 or the network node 12,14, together with computer program code for performing the functions and/or method actions of the embodiments herein. The program code mentioned above may also be provided as a computer program product, for instance in the form of a data carrier carrying computer program code for performing embodiments herein when being loaded into the user equipment 10 or the network node 12,14. One such carrier may be in the form of a CD ROM disc. It is however feasible with other data carriers such as a memory stick. The computer program code may furthermore be provided as pure program code on a server and downloaded to the user equipment 10 or the network node 12,14.

Modifications and other embodiments of the disclosed embodiment(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

AI Acquisition Indicator
AICH Acquisition Indicator Channel
ASC Access Service Class (TS 25.321)
C-EDCH Common-EDCH
CMAC MAC-C is the MAC deployed by the RACH layer
DPCCH Dedicated Physical Control Channel
CELL_DCH RRC State for Dedicated transmissions
CELL_FACH RRC State for Random access and short transmissions
CELL_PCH RRC State with a Cell Paging Channel monitoring
CQI Channel Quality Indicator
DRX Discontinuous Reception
E-AGCH E-DCH Absolute Grant Channel
E-AICH Enhanced AICH
E-AI Enhanced-Acquisition Indicator
E-DCH Enhanced Dedicated Channel
E-HICH E-DCH HARQ Acknowledgement Indicator Channel
E-RNTI E-DCH Radio Network Temporary Identifier
E-RGCH EDCH-Relative Grant Channel
F-DPCH Fractional-Dedicated Physical Channel
HARQ Hybrid Automatic repeat request
H-RNTI HSDPA-Radio Network Temporary Identifier
HS-DPCCH High Speed Dedicated Physical Control Channel
HW Hardware
NW Network
PRACH Physical Random Access Channel
RACH Random Access Channel
RLC Radio Link Protocol
RNTI Radio Network Temporary Identifier
RRC Radio Resource Control
SDU Service Data Unit
SI Scheduling Information/System Information
SIB System Information Block
SN Sequence Number
SNR Signal-to-Noise Ratio
TCP Transmission Control Protocol
TTI Transmission Time Interval
TX Transmission/Transmitter
UE User Equipment
UL Uplink
URA_PCH RRC state .UEs are paged in a UTRAN Registration Area
WCDMA Wideband Code Division Multiple Access

The invention claimed is:

1. A method in a user equipment for determining Hybrid Automatic Repeat Request (HARQ) configuration for a common enhanced dedicated channel configuration in a radio communications network, the method comprising the steps:

receiving a first value from a network node, the first value comprising a bitmap, wherein each bit of the bitmap represents a state of a HARQ process out of a number of HARQ processes for a common enhanced dedicated channel configuration;

receiving a second value from the network node, the second value indicating whether to apply a bit shift operation to the bitmap, the offset of the bit shift operation being calculated based on an index of the common enhanced dedicated channel configuration and the number of HARQ processes; and determining a HARQ configuration for the common enhanced dedicated channel configuration by deriving from the first value and the second value whether a HARQ process for a transmission time interval is active or inactive.

2. A method according to claim 1, further comprising receiving a flag bit indicating whether to use the determined HARQ configuration or a default HARQ configuration.

3. A method according to claim 1, wherein the first value is comprised in a Common Enhanced-Dedicated Channel Configuration Information list.

4. A method according to claim 1, wherein the user equipment uses common physical layer shared resources shared between other user equipments served by the network node.

5. A method according to claim 1, further comprising
transmitting data in a time interval corresponding to an active HARQ process; and
receiving Acknowledged or Not-Acknowledged indications of the transmitted data.

6. A method according to claim 1, wherein the first value indicates a HARQ configuration previously used.

7. A method according to claim 1, wherein the method is applied for a CELL_FACH state of the user equipment.

8. A method according to claim 1, wherein a last read default value applies to all the subsequent HARQ configurations until a new value is found.

9. A method according to claim 1, wherein a default value is set indicating that transmission in one HARQ process is allowed.

10. A method in a network node for signaling Hybrid Automatic Repeat Request (HARQ) configuration for a common enhanced dedicated channel configuration in a radio communications network, the method comprising the steps:
determining a state of a HARQ process of a transmission time interval out of a number of HARQ processes for a common enhanced dedicated channel configuration, the state defining whether the HARQ process is active or inactive;
signaling a HARQ configuration for the common enhanced dedicated channel configuration by broadcasting a first value to a user equipment, the first value comprising a bitmap, wherein a bit of the bitmap represents the state of the HARQ process; and
broadcasting a second value to the user equipment, the second value indicating whether to apply a bit shift operation to the bitmap, the offset of the bit shift operation being calculated based on an index of the common enhanced dedicated channel configuration and the number of HARQ processes.

11. A method according to claim 10, wherein the signaling the HARQ configuration further comprises transmitting a flag bit indicating whether to use the determined HARQ configuration or a default HARQ configuration.

12. A method according to claim 10, wherein the first value indicates a HARQ configuration previously used at the user equipment.

13. A method according to claim 10, wherein the first value indicates a HARQ configuration previously used at the user equipment, wherein the first value is comprised in a Common Enhanced Dedicated Channel Configuration Information list.

14. A method according to claim 10, wherein the method is applied for a CELL_FACH state of the user equipment.

15. A method according to claim 10, further comprising
receiving data from the user equipment over the transmission time interval corresponding to an active HARQ process; and
transmitting an Acknowledged or Not-Acknowledged indication of the transmitted data for the transmission time interval.

16. A user equipment for determining Hybrid Automatic Repeat Request, HARQ, configuration for a common enhanced dedicated channel configuration in a radio communications network, comprising:
a receiver circuit configured to receive a first value, broadcasted from a network node, the first value comprising a bitmap, wherein each bit of the bitmap represents a state of a HARQ process out of a number of HARQ processes for a common enhanced dedicated channel configuration, wherein the receiver circuit is further configured to receive a second value from the network node, the second value indicating whether to apply a bit shift operation to the bitmap; and
a processing circuit configured to determine a HARQ configuration for the common enhanced dedicated channel configuration by applying a bit shift operation to the bitmap, and wherein the processing circuit is further configured to derive from the first value, after the bit shift operation is applied, whether a HARQ process for a transmission time interval is active or inactive.

17. A user equipment according to claim 16, wherein the receiver circuit is further configured to receive a flag bit indicating whether to use the determined HARQ configuration or a default HARQ configuration.

18. A user equipment according to claim 16 wherein the first value is comprised in a Common Enhanced-Dedicated Channel Configuration Information list.

19. A user equipment according to claim 16, further configured to use common physical layer shared resources shared between other user equipments served by the network node.

20. A user equipment according to claim 16, further comprising
a transmitter circuit configured to transmit data in a transmission time interval or intervals corresponding to the active HARQ process or processes; and the receiver is further arranged to receive Acknowledged or Not-Acknowledged indications of the transmitted data.

21. A user equipment according to claim 16, wherein the first value indicates a HARQ configuration previously used.

22. A user equipment according to claim 16, configured to operate in a CELL_FACH state.

23. A user equipment according to claim 16, configured to apply a last read default value to all the subsequent HARQ configurations until a new value is found.

24. A user equipment according to claim 16, configured to have a default value set indicating that transmission in one HARQ process is allowed.

25. A network node for signaling a Hybrid Automatic Repeat Request, HARQ, configuration for a common enhanced dedicated channel configuration in a radio communications network, which network node is arranged to be comprised in the radio communications network and to serve a user equipment, wherein the network node comprises
a processing circuit configured to determine a state of a HARQ process of a transmission time interval out of a number of HARQ processes for a common enhanced dedicated channel configuration, which state is defining whether the HARQ process is active or inactive; and
a transmitter circuit configured to signal HARQ configuration for the common enhanced dedicated channel configuration by broadcasting a first value representing the state of the HARQ process, the first value comprising a bitmap, wherein each bit of the bitmap represents a state of a HARQ process, and wherein the transmitter circuit is further configured to broadcast a second value, the second value indicating whether to apply a bit shift operation to the bitmap, the offset of the bit shift operation being calculated based on an index of the common enhanced dedicated channel configuration and the number of HARQ processes.

26. A network node according to claim 25, wherein the transmitter circuit is further configured to transmit a flag bit indicating whether to use the determined HARQ configuration or a default HARQ configuration.

27. A network node according to claim 25, wherein the first value indicates a HARQ configuration previously used at the user equipment.

28. A network node according to claim 25, wherein the first value is comprised in a Common Enhanced-Dedicated Channel Configuration Information list.

29. A network node according to claim 25, configured to apply for operation in a CELL_FACH state.

30. A network node according to claim 25, further comprising a receiver circuit configured to receive data from the user equipment over transmission time interval or intervals corresponding to active HARQ process or processes; and the transmitter circuit is further configured to transmit an Acknowledged and/or Not-Acknowledged indication or indications of the transmitted data for the transmission time interval or intervals.

* * * * *

UNITED STATES PATENT AND TRADEMARK OFFICE
CERTIFICATE OF CORRECTION

PATENT NO.         : 9,055,452 B2                                                 Page 1 of 1
APPLICATION NO.    : 13/696356
DATED              : June 9, 2015
INVENTOR(S)        : Ramos et al.

It is certified that error appears in the above-identified patent and that said Letters Patent is hereby corrected as shown below:

Specification

In Column 12, Line 6, delete "ARQ shifting" and insert -- HARQ shifting --, therefor.

In Column 13, Line 19, delete "user equipment" and insert -- user equipment 10 --, therefor.

In Column 15, Lines 27-28, delete "user equipment" and insert -- user equipment 10 --, therefor.

Claims

In Column 17, Line 51, in Claim 11, delete "the signaling" and insert -- signaling --, therefor.

In Column 18, Line 56, in Claim 25, delete "comprises" and insert -- comprises: --, therefor.

Signed and Sealed this
Twenty-ninth Day of December, 2015

Michelle K. Lee
*Director of the United States Patent and Trademark Office*